United States Patent [19]

Birdling

[11] Patent Number: 4,962,615
[45] Date of Patent: Oct. 16, 1990

[54] WINDOWS AND DOORS

[75] Inventor: Ian A. Birdling, Upper Hutt, New Zealand

[73] Assignee: Birdling Industries Limited, Upper Hutt, New Zealand

[21] Appl. No.: 102,427

[22] Filed: Sep. 29, 1987

[30] Foreign Application Priority Data

Sep. 29, 1986 [NZ] New Zealand ........................ 217713
Oct. 10, 1986 [NZ] New Zealand ........................ 217889

[51] Int. Cl.$^5$ ............................................. E05D 11/00
[52] U.S. Cl. ........................................ 49/381; 49/383
[58] Field of Search ................ 49/381, 394, 490, 488, 49/463, 383; 16/225; 52/207

[56] References Cited

U.S. PATENT DOCUMENTS

| | | | |
|---|---|---|---|
| 243,405 | 6/1881 | Rush | 16/225 X |
| 1,765,543 | 6/1930 | Schlacks | 49/394 |
| 1,775,083 | 9/1930 | Austin | 49/488 X |
| 2,394,870 | 2/1946 | Orlin | 49/463 X |
| 2,428,731 | 10/1947 | Abrams | 49/490 X |
| 4,132,035 | 1/1979 | Frambach | 49/381 X |
| 4,290,233 | 9/1981 | Hubbard | 49/383 |
| 4,392,330 | 7/1983 | Buhr | 49/381 |
| 4,412,739 | 11/1983 | Freiberg | 16/225 C |
| 4,446,184 | 5/1984 | Bowser . | |

FOREIGN PATENT DOCUMENTS

| | | |
|---|---|---|
| 289704 | 2/1967 | Australia . |
| 405171 | 2/1967 | Australia . |
| 442119 | 6/1968 | Australia . |
| 491936 | 1/1975 | Australia . |
| 11878 | 9/1983 | Australia . |
| 295105 | 12/1971 | Austria . |
| 858507 | 12/1952 | Fed. Rep. of Germany ........ 52/207 |
| 8006285 | 6/1980 | Fed. Rep. of Germany . |
| 2926903 | 1/1981 | Fed. Rep. of Germany . |

Primary Examiner—James R. Brittain
Attorney, Agent, or Firm—Fleit, Jacobson, Cohn, Price, Holman & Stern

[57] ABSTRACT

A window or door assembly is disclosed consisting of a door or window pane and first and second pane retaining frame members and first and second hinge members mountable with the pane retaining members. The assembly is distinguished to conventional assemblies in that there is provided a bead of sealing material, preferably silicone rubber, adjoining abutting edges of a pivotal pane with a fixed pane of the window or door. The seal remains in place while the pane is being pivoted. The combination reduces of the amount of framing required in the construction of a window while at the same time increasing the amount of glass with a nearly invisible joint between the pivotal pane and the fixed pane.

7 Claims, 6 Drawing Sheets

WINDOWS AND DOORS

FIELD OF INVENTION

This invention relates to improvements in window and door frames. More particularly, it relates to improvements in window or door pane fittings of glass in aluminium joinery but is not limited thereto.

Silicone beading material is known to have a very high adhesion to glass and other similar material. Thus, it is known to seal abutting edges of panes of glass using a bead of silicone. Also, in the U.S. Pat. No. 4,412,739, a silicone extrusion product is used as a bead which serves as a hinge for glass plates in a photolithographic apparatus.

Another known property of silicon is that it does not have the same high adhesion properties when subjected to twisting forces as would happen if a bead alone were used as a hinge for a window or door pane of glass.

In a conventional window or door joinery the pivotal sash is constructed of a pane of glass or other transparent or translucent material which is surrounded on all four sides by a frame. This frame, usually in conjunction with sealing elements, seals the opening against the elements.

It is an object of this invention to lessen the need for as many frame members in such joinery or at least to offer the public a useful choice.

Accordingly, the invention may be said broadly to consist in a window or door assembly comprising:

a door or window pane of transparent or translucent material, a pane retaining frame member, a hinge member mountable with said pane retaining frame member, and, a bead of sealing material along the edge of the said pane adjacent the pivoting axis of said pane.

the arrangement and construction being such that in use a said pane mounted in said pane retaining frame member is pivotal on said hinge member, said bead of sealing material forming with said edge adjacent said pivoting axis a seal with an adjacent fixed or pivotal pane, which seal remains in place while said pane is being pivoted.

Preferably there are provided a pair of pane retaining frame members.

Preferably there are provided a pair of hinge members each mountable said pane retaining frame members.

Preferably the assembly is a window assembly.

Preferably said window is of a transparent material.

Preferably said transparent material is glass.

Alternatively said assembly is a door assembly.

Preferably said door is of transparent material.

Preferably said transparent material is glass.

Preferably said pane retaining members are aluminium heads and sills,

Preferably there is in addition provided a third pane retaining member joining said first and second pane retaining members along the side of said pane parallel to and remote from said pivotal axis.

Preferably said third pane retaining member is an aluminium style.

Alternatively said third pane retaining member is a sill and said first and second pane retaining members are styles.

In a still further alternative said frame retaining member is a head and said first and second pane retaining members are styles.

Preferably said bead is a bead of silicone rubber.

Alternatively said bead is of an equivalent sealing material.

Preferably said hinges are pivot bushes or friction stays.

Preferably said hinges are of polytetrafluoroethelene (PTFE).

The invention consists in the foregoing and also envisages constructions of which the following gives examples.

BRIEF DESCRIPTION OF THE DRAWINGS

The invention may be more fully understood by having reference to the accompanying drawings in which:

FIG. 12A is a top elevational view of a spring mounted stay.

DETAILED DESCRIPTION OF THE INVENTION

Aluminum Framed Window

Figure 1:
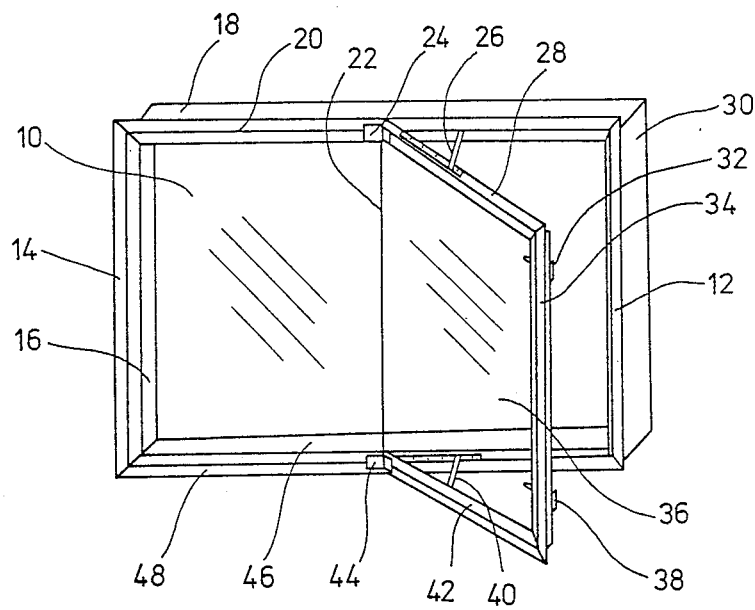
FIG. 1 is a perspective view of a first embodiment of a window according to the invention in an open position.

In the embodiment illustrated in FIG. 1, there is a fixed pane of glass 10 mounted in a head frame 20. a style frames 12 and 14 and a bottom frame 48. Outside the respective frame members are a bottom reveal 46, side reveals 16 and 30 and a head reveal 18. The pane of glass 36 which can be opened is mounted in a head sash 28, a style sash 34 and a frame sash 42. Cap hinges 24 and 44 at the top and bottom of the joint between the pivotal pane 36 and the fixed pane 10 are mounted on head frame 20, head sash 28 and on bottom frame 48 and frame sash 42.

Figure 3:
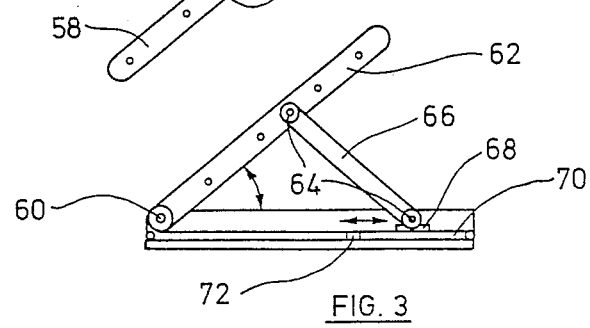
FIG. 3 is schematic representation of a stay which may be used as an alternative to that illustrated in FIG. 2.

A silicone bead 22 runs with the length of the panes of glass 10 and 36 from cap hinge 24 to cap hinge 44. A pair of stays 40 and 26 of the type illustrated in FIG. 3 are mounted to head sash 28 and frame sash 42 respectively. A pair of sash locks 32 and 38 complete the construction of the window.

Figure 2:
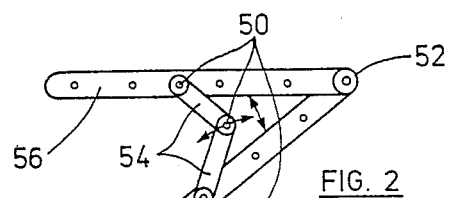
FIG. 2 is schematic representation of a stay for use with a window in accordance with the invention.

A stay which may be used in conjunction with the window illustrated in FIG. 1 is illustrated in FIG. 2. A pair of stay arms 56 and 58 are pivotally connected by pivot bush 52. One of the arms is mounted to the frame of the window while the other arm is mounted to either the head or bottom sash member. A pair of connecting slay arms 54 are themselves pivotally joined to the stay arms 56 and 58 and to each other by friction bushes 50. Such a stay can be opened to form an angle up to 90° between arms 56 and 58. It can be used for a sash opening both inwards and outwards and for casement or awning windows.

The stay assembly illustrated in FIG. 3 comprises a stay arm 62 pivotal on a pivot bush 60 pivotal from a slide tube 70 which itself is mounted to a fixed frame. There is a hole 72 in tube 70 for adjusting the sliding friction. A stay arm control 66 is mounted at either end with a friction pivot bush 64. The upper bush 64 is mounted in stay arm 62. The lower bush 64 is mounted on pivot slide 68. Slide 68 forms a piston within tube 70 and the friction between the seal of the piston and the tube can be adjusted with an adjustment screw. The friction is obtained by the seal sliding within the tube 70.

SEALING BEAD

Figure 4:
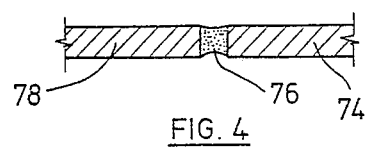
FIG. 4 is a detailed sectional view of a silicone bead along the pivotal axis of a window or door according to the invention.

If FIG. 4 there is illustrated a typical silicone rubber seal bead 76 between two abutting panes of glass 78 and 74. The silicone seal is preferably of a clear colourless type so that it is not readily visible. It is put in place after the adjacent panes of glass have been mounted and it is injected as a single bead.

One preferred type of beading material is a one part acetoxy type sealant sold under the trade name "Ados A78 Vision Clear Silicone" by Elastomeric Coatings Limited, of Eastern Hutt Road, Taila, Wellington, New Zealand. This material cures to a silicone rubber upon contact with moisture in ambient air at room temperature. After curing it is substantially transparent.

Other silicone rubber sealants known to those skilled in the art may also be employed. One component systems with an acetic acid cure or a neutral cure may also be employed. Alternatively a two part system which is solvent cured may be employed.

The seal is preferably installed in the factory where placement and quantity can be better controlled.

The seal may also be installed on the site of installation by, for example, use of a sealant.

The silicone rubber does not need to be clear and colourless. The seal does not need to be of silicone rubber. For example latex based sealants may be employed as an alternative. Further alternatives are epoxy based sealants or ultraviolet resistant polyvinyl chloride sealants. Other sealants known to those skilled in the art may be substituted.

The only requirements for the sealant are that it adheres strongly to glass and that it is able to withstand repealed flexing.

AWNING WINDOWS

Figure 5:
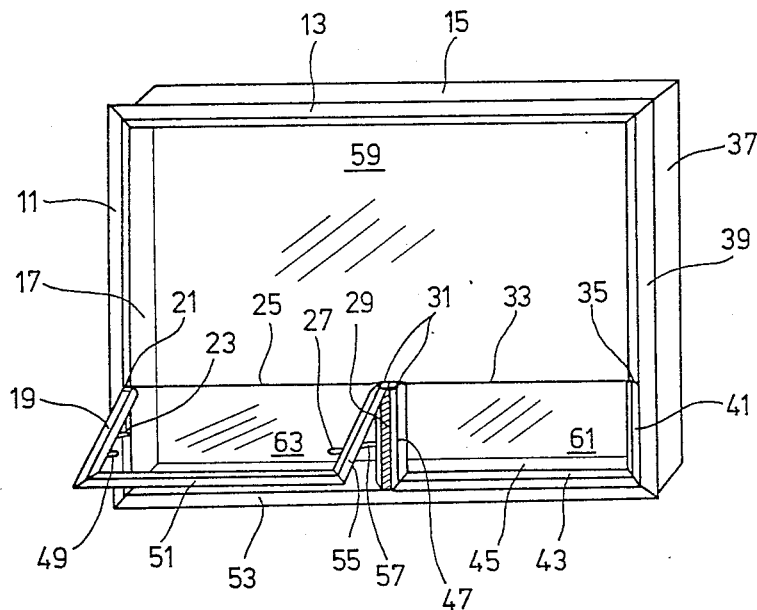
FIG. 5 is a perspective view of an awning window according to the inventor with two sashes divided by a floating mullion.
Figure 6:
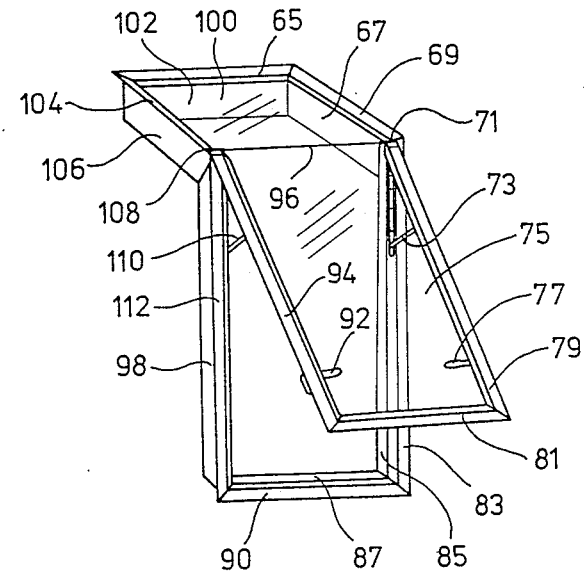
FIG. 6 is a perspective view of another type of awning window according to the invention.

A pair of awning windows are illustrated in FIGS. 5 and 6. In the embodiment illustrated in FIG. 5 there is a fixed pane of glass 59 and pivotal panes 61 and 63. Pane 59 is encased in side frame 11, head frame 13 and side frame 39. Side reveals 17 and 37 and top reveal 15 are also illustrated.

The left hand pivotal pane 63 is mounted in style sashes 19 and 55 and frame sash 51. Its upper edge is joined to the bottom of pane 59 by silicone bead 25. A cap hinge 21 joins sash frame 19 to side frame 11. A cap hinge 31 joins style sash 55 to floating mullion 29, cap hinge 21 joining style sash 19 to frame 11. Handles 27 and 49 lock the sash. A pair of stays 23 and 57 are illustrated. Pivotal pane 61 is encased in style sashes 47 and 41 and frame sash 43. A silicone bead 33 completes the connection with pane 59. Style sash 47 is joined to floating mullion by hinge 31, style sash 41 to style frame 39 by cap hinge 35. The handles and sashes are corresponding to those in association with pane 63 are hidden behind the frame members. Lower reveal 45 extends inwardly from sill frame 63.

In the embodiment illustrated in FIG. 6 the awning window pivots outwardly from a sky light. Glass roof 100 is mounted in frame side members 104 and 69 and frame head member 65. Side reveals 106 and 67 and head reveal 102 complete the construction of the sky light. The awning window comprises a pane 75 mounted in style sashes 94 and 79 and sill sash 81. A bead of silicone 96 joins the edges of glass panes 75 and 100. A pair of cap hinges 71 and 108 join the edges of frame members 104 and 69 with style sashes 94 and 79 respectively. A pair of stays 110 and 73 restrain the awning window as illustrated. The frame in which the awning window fits has frames styles 112 and 83 and sill frame 90 and side reveals 98 and 85 and sill reveal 87. A pair of locking handles 92 and 77 complete the construction.

DOUBLE DOORS

Figure 7:
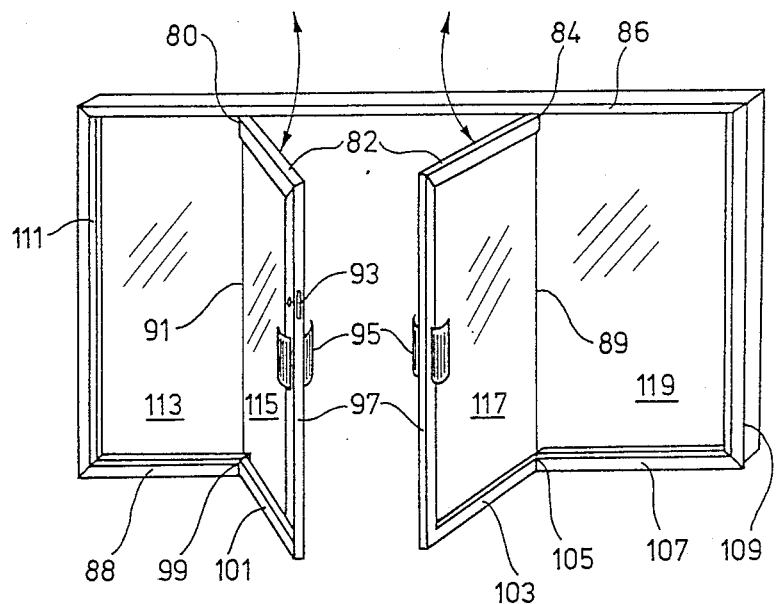
FIG. 7 is a perspective view of a pair of opening doors with adjacent picture windows according to the invention.

In the embodiment illustrated in FIG. 7 a pair of glass doors are shown mounted adjacent fixed full length windows. The frame construction comprises a pair of styles 111 and 109, head frame 86 and sill frames 88 and 107. A full length fixed pane of glass 103 is mounted to one side of the doors and another fixed pane 119 to the right hand side of the doors. The doors comprise panes of glass 115 and 117 pane 117 is mounted in head frame member 82, style 97 and door sill 101. Pane 107 is mounted in a head frame member 82, a door style 97 and a sill frame 103. A bead of silicone material 91 joins fixed pane 113 with door pane 115. Standard door hinges 80 and 99 are at the top and the bottom of the left hand door. Similarly standard door hinges 84 and 105 are the top and bottom of the right hand door. A bead of silicone material 89 joins abutting edges of panes 117 and 119. A lock 93 and handles 95 are illustrated.

BAY WINDOWS

Figure 8:
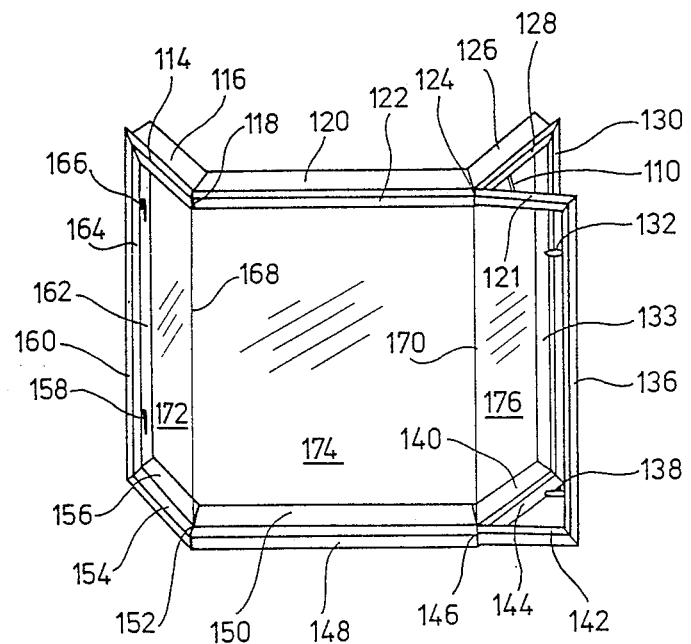
FIG. 8 is a bay window according to the invention.

A bay window comprising another embodiment of the invention is illustrated in FIG. 8. Glass panes 172 and 176 which may be opened Are mounted to either side of fixed pane 174. Pane 174 is mounted in a top frame member 122 and a sill frame 148. Top reveal 120 and the bottom reveal 150 extend inwardly from frame members 122 and 148 respectively. Pane 172 is encased in a top sash 114, a style frame 164 and a sill sash 154.

Top reveal 116, side reveal 162 and bottom reveal 166 complete the construction of the window. The frame is pivoted on cap hinges 118 and 152 at the top and bottom respectively. Locking handles 166 and 158 secure style frame 164 to frame sash 160. The right hand pane 176 is encased in a head sash member 121, a style sash 136 and a sill sash 142. Silicone beads 168 and 170 seal the edges of panes 172 and 176 along either edge of pane 174. Locking handles 132 and 138 secure style sash 136 to reveal 133. Reveals 126 and 140 together with head frame member 128 style frame member 130 and sill frame member 144 complete the construction. Cap hinges 124 and 146 are mounted on the edges of the upper frame member 121 and style frame member 142 to and or frame members 122 and 148. A stay 110 retains the pivotal window in the open position.

BI-FOLD WINDOWS OR DOORS

Figure 9:
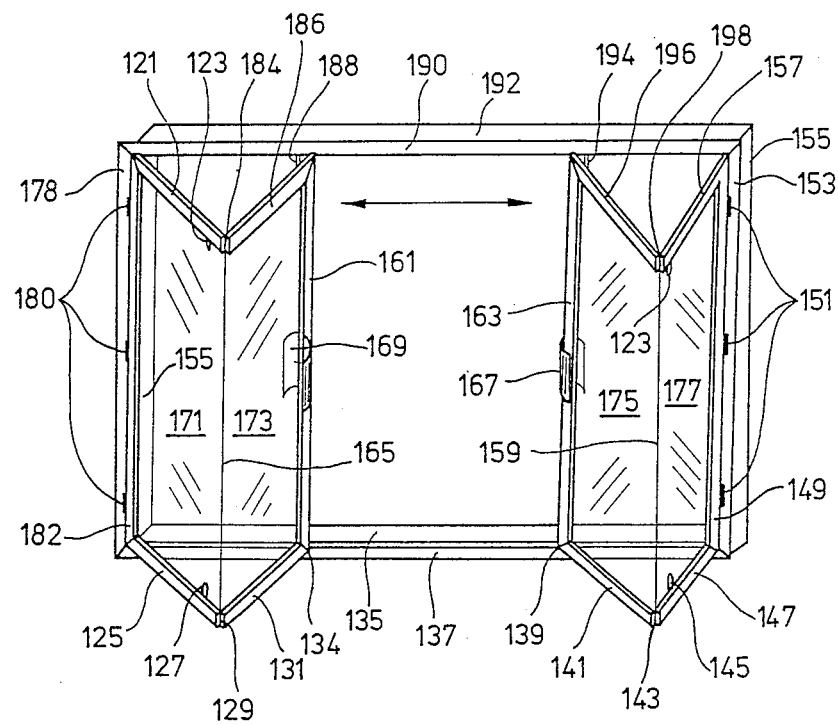
FIG. 9 is a perspective view of a pair of a bi-fold doors or windows according to the invention.

In the embodiment illustrated in FIG. 9 there is shown a pair of bi-fold doors which may operate with the glass folding inwardly or outwardly. The left hand door comprises panes of glass 171 and 173 joined at abutting edges by a bead of silicone 165. The opening comprises a head frame 190 and the sill frame 137 with the door styles 178 and 153. Top reveal 192 and bottom reveal 135 together with side reveals 155 and bottom reveal 135 complete the frame. The left hand door has a pair of head frames 121 and 186, sill frames 125 and 131 and style frames 182 and 161. Style frame 182 is mounted on the three butt hinges 180 in the embodiment illustrated. An upper pivot slide 188 and a bottom pivot slide 134 secure the door head frame 186 and sill frame 131 in a guideway in head frame 190 and in sill frame 137. Cap hinges 134 and 129 allow pivoting of the upper 121, 186 and lower (125, 131) frame members. Handle 169 completes the construction of the left hand door. In operation of the door may be pivoted to open and close with the pivot slides 188 and 134 sliding in their respective guideways while at the same time serving as pivot axes.

In the right hand side of the door panes 175 and 177 are joined at their pivotal edges by silicone bead 159. Head frame 196 and sill frame 141 together with style frame 163 are mounted on the other three sides of pane 175. Head frame 157, sill frame 149 and bottom frame 147 are mounted on the other sides of pane 177. Cap hinges 198 and 143 allow pivoting of the upper (196, 197) and lower (141, 147) frame members. Style frame 149 is mounted on three butt hinges 151 to frame member 153. Slide pivots 134 and 139 serve the same function as slide pivots 188 and 134 on the left hand door operating in the guideways in upper frame member 190 and that in lower frame member 137. Handle 167 is mounted on style frame member 163. Locking handles 123 and 127 are provided to lock the left handed door, locking handles 123 and 145 are provided to lock the right hand door.

Figure 10:
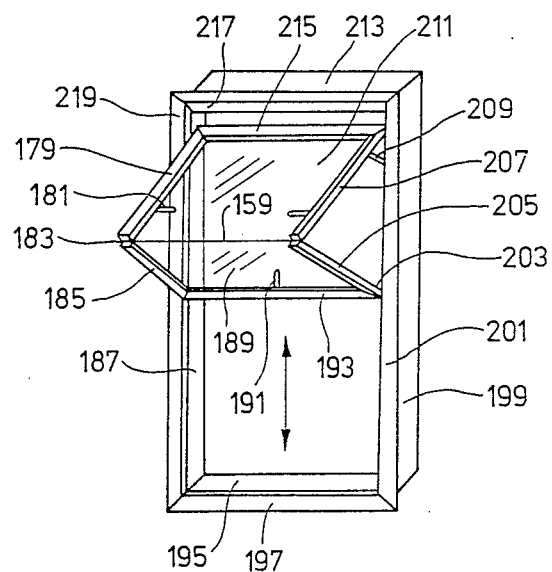
FIG. 10 is a perspective view of of a bi-fold window which opens and closes in a vertical direction.

A bi-folding window is illustrated in FIG. 10. Panes 211 and 189 are joined at their abutting edges by a bead of silicone 159. The window opening comprises a head frame 217, style frames 201 and 219 and sill frame 197. The opening is completed by top and bottom reveals 213 and 195 and side reveals 187 and 199. Pane 211 is mounted in head sash 215, style sashes 179 and 207. Locking handles 181 are also mounted on style sashes 179 and 207. Sliding pivots 209 are mounted to either end of head sash 215. Guideways are provided in frame styles 219 and 201. A stay 209 is also illustrated between style sash 207 and style frame 201.

Pane 189 is mounted between style sashes 185 and 205 and sill sash 193. A pivot slide 203 is illustrated on style sash 206. Pivot slide 203 slides in a guideway within frame style 201. Locking handle 191 is provided on sill sash 193 for securing it to a catch on reveal 195. Pivoting of style sash 179 from style sash 185 is on cap hinge 183.

FITTINGS

Figure 11:
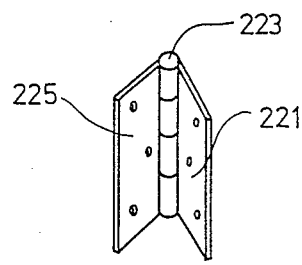
FIG. 11 is a perspective view of a standard hinge.

In FIG. 11 there is shown a butt hinge comprising flanges 225 and 221 and a pin 223.

Figure 12:
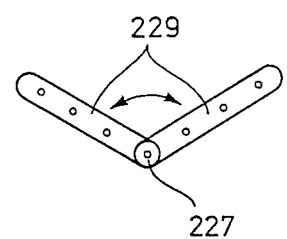
FIG. 12 is an elevational view of a pair of pivot arms.
Figure 12:
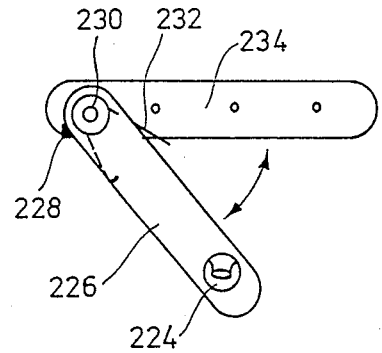

In FIG. 12 there is illustrated a hinge comprising a pair of pivot arms 229 which may be riveted or bolted into the bottoms or tops of frame members. The arms are pivotal about a pivot bush 227. This can be used as hinge 183 in FIG. 10 or hinges 184, 129, 194 and 143 in FIG. 9.

FIG. 12A illustrates a sliding stay. The stay comprises arms 226 and 234, a pivot bush 230, a spring 232 and stop 228. A guide pawl 224 is also illustrated. Arm 234 is in use attached to the fixed portion of the window or door frame by riveting or other fixing means.

Figure 13:
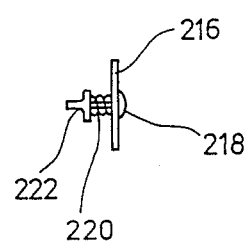
FIG. 13 is an end elevation of a rivet through a pivot arm.

FIG. 13 is a view of the stay shown in FIG. 12A in end elevation comprising a pivot arm 216, a pivot bush 218, a spring 220 and a guide pawl 222. As a window or door is opened or closed locator 222 will slide along a guideway in the window or door frame. The sliding stays in FIGS. 12A and 13 may be used as slides 188, 134, 194 and 139 in the embodiment in FIG. 9 and as slide 203 in FIG. 10.

Figure 14:
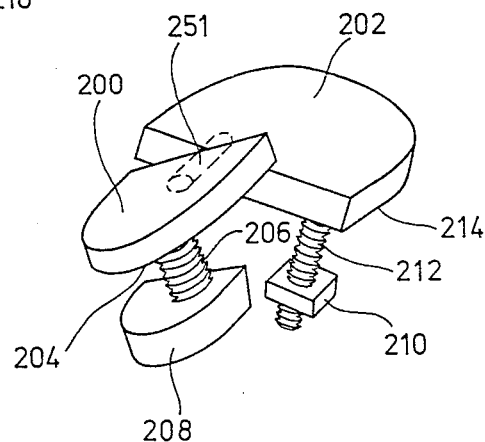
FIG. 14 is a perspective view of a hinge and mounting member for a sunroof.

FIG. 14 illustrates a mounting member for mounting panes of glass, for example, in a sunroof for an automobile. A plate 200 having a bolt member 206 extending downwardly therefrom into a nut 208 for securing a pane of glass is illustrated. A seal 204 is provided on the under face of plate 200. A pivot 51 extends between plate 200 and plate 202. Plate 202 has a bolt 212 extending therefrom through the roof, for example a car. A nut 210 is threaded on to bolt 212. A sealing material 214 is provided on the under face of plate 202. A pivot pin 251 extends from the side of plate 200 in the side of plate 202.

VEHICLE SUNROOF

Figure 15:
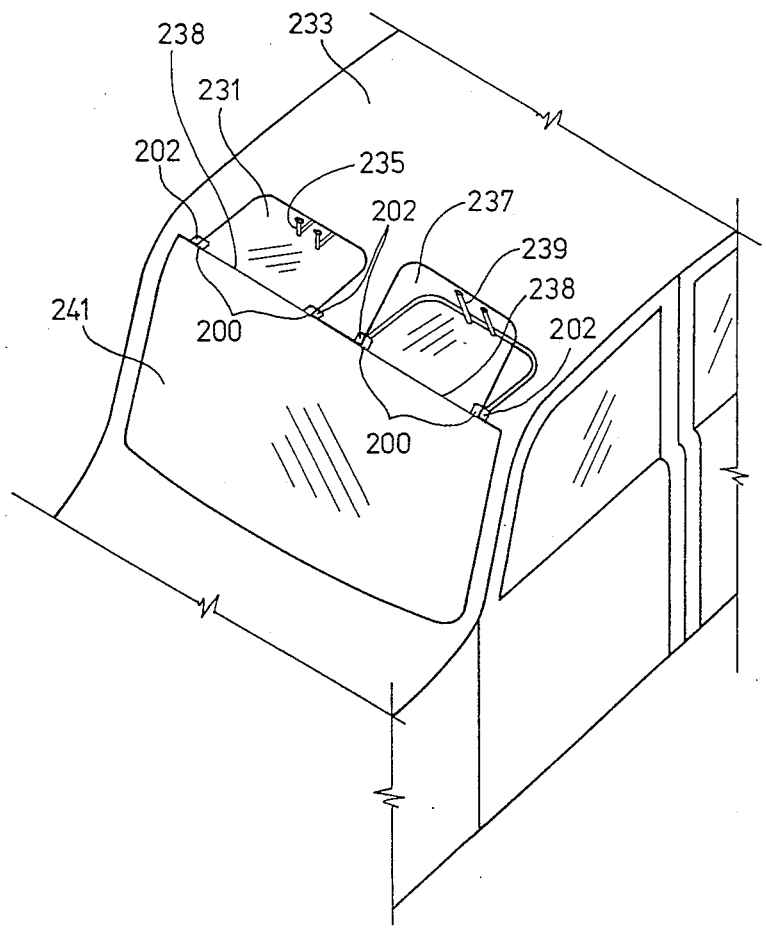
FIG. 15 is a perspective view of a pair of sunroof embodiments forming an extension to the windshield of a car.
Figure 16:
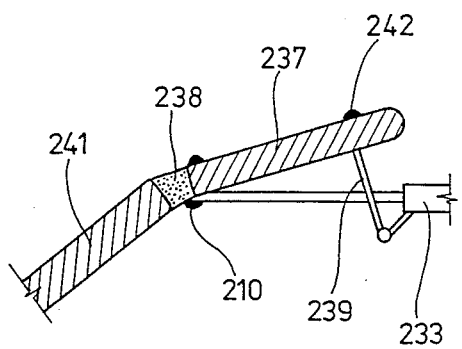
FIG. 16 is a sectional view inside elevation of the open sunroof in FIG. 15.

There is illustrated in FIGS. 15 and 16 an embodiment of the invention in which a sunroof edge in a vehicle abuts the lop of the windshield and a bead of silicone is provided at the butting edge. In the embodiment illustrated the right hand sunroof is closed and the left hand sunroof is open. The right hand sunroof comprises a pane of glass 231 clamped with the hinging portion 200 of the arrangement illustrated in FIG. 14. Similarly the plate 202 which secures the hinge to the roof 233 of the automobile is illustrated. The pane 231 is closed with a locking handle 235 in the arrangement shown in the right hand sunroof. The left hand sunroof pane 237 is illustrated in the open position with locking handle 239 acting as a stay to retain the sunroof 237 in the position illustrated. A bolt 242 secures the sunroof to the handle 239.

Windshield 241 is sealed at its top edge to the leading edges of sunroof panes 231 and 237 by leads of silicone material 238.

ALTERNATIVE FRAMING MATERIALS

The invention has been exemplified by aluminium framing in the embodiments illustrated. Window or door systems as illustrated could equally be constructed of wooden or plastics materials such as ultraviolet resistant polyvinyl chloride.

Other permutations and combinations within the scope of the present invention as defined in the appended claims will be apparent to those skilled in the art.

What is claimed is:

1. In a window or door assembly the combination comprising a fixed panel, a pivotal pane of a translucent material, hinge means between the panel and the pane, the panel and the pane having adjacent edges defining a hinge line therebetween, an elongate bead of polymeric sealing material bonded to each of said edges to form a seal therebetween which flexes during movement of the pivotal pane and is able to withstand repeated flexing, the pane and panel having respective frame members at opposite ends of the bead and the hinge means having hinges connecting the respective frame members.

2. An assembly according to claim 1 which includes a pane-retaining frame member on one side of the pane perpendicular to the hinge line and a panel-retaining frame member on one side of the panel perpendicular to the hinge line wherein the hinge means is connected between the frame members.

3. An assembly according to claim 2 including a stay member connected between the frame members.

4. An assembly as claimed in claim 3 including further pane and panel retaining frame members on opposite sides of the pane and panel perpendicular to the hinge line and still further pane and panel retaining members on edges of the pane and panel remote from said adjacent edges.

5. An assembly as claimed in claim 4 wherein the frame members are aluminum.

6. An assembly as claimed in claim 1 wherein said bead is a bead of silicone rubber.

7. An assembly as claimed in claim 1, wherein said translucent material is a transparent material.

* * * * *